(12) United States Patent
Romm

(10) Patent No.: US 6,598,125 B2
(45) Date of Patent: Jul. 22, 2003

(54) METHOD FOR CACHING INFORMATION BETWEEN WORK SESSIONS

(75) Inventor: Amnon Romm, Thornhill (CA)

(73) Assignee: Exent Technologies, Ltd, Petah-Tikva (IR)

(*) Notice: Subject to any disclaimer, the term of this patent is extended or adjusted under 35 U.S.C. 154(b) by 0 days.

(21) Appl. No.: 09/866,509

(22) Filed: May 25, 2001

(65) Prior Publication Data

US 2002/0091901 A1 Jul. 11, 2002

Related U.S. Application Data

(60) Provisional application No. 60/207,125, filed on May 25, 2000.

(51) Int. Cl.[7] .............................................. G06F 12/00
(52) U.S. Cl. ...................................... 711/133; 711/136
(58) Field of Search ................. 711/129–136, 147–159, 711/170–173; 345/557; 709/203, 213–226

(56) References Cited

U.S. PATENT DOCUMENTS

| | | | | |
|---|---|---|---|---|
| 5,537,635 A | * | 7/1996 | Douglas | 711/129 |
| 5,559,984 A | | 9/1996 | Nakano et al. | 711/121 |
| 5,943,687 A | * | 8/1999 | Liedberg | 711/156 |
| 6,012,126 A | * | 1/2000 | Aggarwal et al. | 711/133 |
| 6,032,227 A | * | 2/2000 | Shaheen et al. | 711/129 |
| 6,049,850 A | * | 4/2000 | Vishlitzky et al. | 711/136 |

FOREIGN PATENT DOCUMENTS

| | | |
|---|---|---|
| EP | 0543614 A1 | 5/1993 |
| WO | WO 97/04393 | 2/1997 |

OTHER PUBLICATIONS

Castro et al., "HAC: Hybirk Adaptive Caching for Distributed Storage Systems," Operating Systems Review (SIGOPS), ACM Headquarter, New York, vol. 31, No. 5 (Dec. 1, 1997) (XP–000771025).

* cited by examiner

Primary Examiner—Do Hyun Yoo
Assistant Examiner—Nasser Moazzami
(74) Attorney, Agent, or Firm—Testa, Hurwitz & Thibeault, LLP

(57) ABSTRACT

A method of caching information between work sessions for future use is described. The method efficiently determines those blocks of information least likely to be required for future use and preferentially discards such blocks from the cache when additional cache storage space is needed. The method also provides for the dynamic allocation of cache space between work sessions of different content.

20 Claims, 1 Drawing Sheet

METHOD FOR CACHING INFORMATION BETWEEN WORK SESSIONS

RELATED APPLICATIONS

This application claims the benefit of U.S. Provisional Application No. 60/207,125. filed May 25, 2000. The entire disclosure of this application is incorporated herein by reference.

FIELD OF THE INVENTION

This technology relates generally to a method for caching information on the hard drive of a client computer. More particularly, the technology relates to a method for the caching of information between work sessions to increase the local accessibility of blocks of information.

BACKGROUND

Client computers are used to execute program software for many purposes. The software executed can comprises many different applications and types of content. Examples of content include any windows-based software, games, various applications, or any software that utilizes the file system of the client computer and employs session-base caching. Content can be executed on clients that utilize a variety of operating systems and hardware configurations. Content can be accessed many different times over the course of one or more work sessions.

A client computer requires blocks of information for the content to operate properly. The blocks of information can come from different data sources, such as a compact disk (CD), a DVD, or from another computer such as a file server. The client computer can be connected to the file server by a local network (LAN) or a wide area network (WAN), such as the Internet.

Generally, content must be installed on a client computer before it can be executed. It is generally installed from a data source, such as those listed above. During the installation process, files of a certain size that are frequently required for operation of the content are copied to the hard drive of the client computer. From there they are readily accessible. Since the hard drive of the client computer is generally limited in storage capacity, some of the large content files may not be copied to it. These large files could comprise, for example, video files, large executable files, or Dynamic Link Libraries. When they are needed these large content files must then be retrieved from the data source, which has a slower retrieval time. Alternatively, if only a portion of a large content file is to be used, the blocks of information representing this portion of the file can be cached on the hard drive of the client computer.

After installation, a work session can be started to commence use of the content. During the work session additional blocks of information are required. Some blocks of information are used more frequently than other blocks. The blocks of information can be obtained directly from the data source of the content if it is still available during the work session, although access times to this information are generally constrained. The slow response times are generally caused by the various technical and hardware limitations of the data source being used.

Conversely, the access time to blocks of information stored on the hard drive of a client computer is comparatively fast. However, the hard drive of a client computer may possess only limited storage capacity. For these reasons, the hard drive of the client computer is the preferred storage location for blocks of frequently accessed information that are of manageable size.

To reduce the impact of these limitations, various caching methods are used to optimize accessibility to the information required by the content of an active work session. A certain amount of storage space is set aside on the hard drive of the client computer for each content. As the content is used, blocks of information brought to the client compute from the data source are temporarily stored (cached) in this allocated space on the hard drive. As the space fills and new information needs to be stored, the oldest information is discarded to make room for the new. By this means faster repeated access can be provided to blocks of information that have been most recently used. Ultimately. When the work session using this content on the client computer is completed, the allocated space that was used on the hard drive is made available for use for other purposes. Unfortunately, the next time a work session is commenced for the same content, the blocks of information that had been cached are no longer available and need to be obtained again from the data source. This results in inefficiency and delays, and diminishes the overall experiences of the operator of the client computer.

What is needed is an improved method of caching blocks of information on a local client computer that reduces information transfer requirements from the data source, thereby improving the responsiveness of the client computer.

SUMMARY OF THE INVENTION

The present invention features a method for caching blocks of information on a client computer to address the preceding problems. In one aspect, the invention provides for the caching of blocks of information in an allocated storage space on the hard drive of a client computer. Access frequency information is stored for each block of information cached and is used to calculate a discard priority for the stored block. When an incoming block of information needs to be stored, storage space in the cache is made available for it by discarding blocks of information based on their calculated discard priority.

Another embodiment of the invention provides for the dynamic allocation of storage space on the computer between different caches. The dynamic allocation can reassign storage space from the cache of an inactive work session to that of an active work session or from the cache of an active work session to that of another active work session. The storage space to be reassigned is determined based upon block discard priority.

In another embodiment of the invention, the size of the allocated storage space for the work session can be changed. Reduction of the allocated storage space is performed by discarding blocks of information, based on their discard priority.

In yet another embodiment of the invention, the cached blocks of information are not discarded at the end of a work session, but are retained for use in a subsequent work session. In yet another embodiment, the access frequency information used to determine the discard priority of a block is determined using the number of times the block has been accessed in the present work session, in a prior work session, in a plurality of prior work sessions, or some combination. The discard priority determination can also be adjusted based on the amount of time since it has been most recently accessed.

Another aspect of the invention features a method for caching, blocks of information on the hard drive client computer employing, multiple work sessions. Storage space is allocated on a client computer for the cache of each cache. Access Blocks of information are the stored in the storage space of each. Access frequency information is stored for each block of information cached, and is used to calculated a discard priority for each stored block. When an incoming block of information needs to be stored, storage space is provided for the new block by discarding stored blocks of information from any of the active work sessions. The blocks to be discarded are determined based upon their calculated discard priority.

Another embodiment of the invention provides storage for the incoming block of information by discarding blocks of information from the cache of an inactive work session to that of an active work session, or from the cache of an active work session to that of another active work session. The storage space to be reassigned is determined based upon block discard priority.

In another embodiment of the invention, the cached blocks of information are not discarded at the end of a work session, but are retained for use in a subsequent work session. Another embodiment of the invention allows the size of the allocated storage space for a work session can be changed. Reduction of the allocated storage space is performed by discarding blocks of information, based on their discard priority.

In yet another embodiment, the access frequency information used to determine the discard priority of a block is determined using the number of times the block has been accessed in the present work session, in a prior work session, in a plurality of prior work sessions, or some combination. The discard priority determination can also be adjusted based on the amount of time since it has been most recently accessed.

Yet another aspect of the invention features a method for caching blocks of information on a client computer. Blocks of information are cached in the storage space of a client computer. Access frequency information is stored for each block of information cached, and is used to calculate a discard priority for the stored block. When an incoming block of information needs to be stored, storage space in the cache is made available for it by discarding blocks of information based on their calculated discard priority.

An embodiment of the invention provides for the dynamic allocation of the storage space used to cache the blocks of information. The access frequency information used to determine the discard priority of a block is determined using the number of times the block has been accessed in the present work session, in a prior work session in a plurality of prior work sessions, or some combination. The discard priority determination can also be adjusted based on the amount of time since it has been most recently accessed.

BRIEF DESCRIPTION OF THE DRAWING

These and other features of the invention are more fully described below in the detailed description and accompanying drawing.

DETAILED DESCRIPTION

Figure 1:
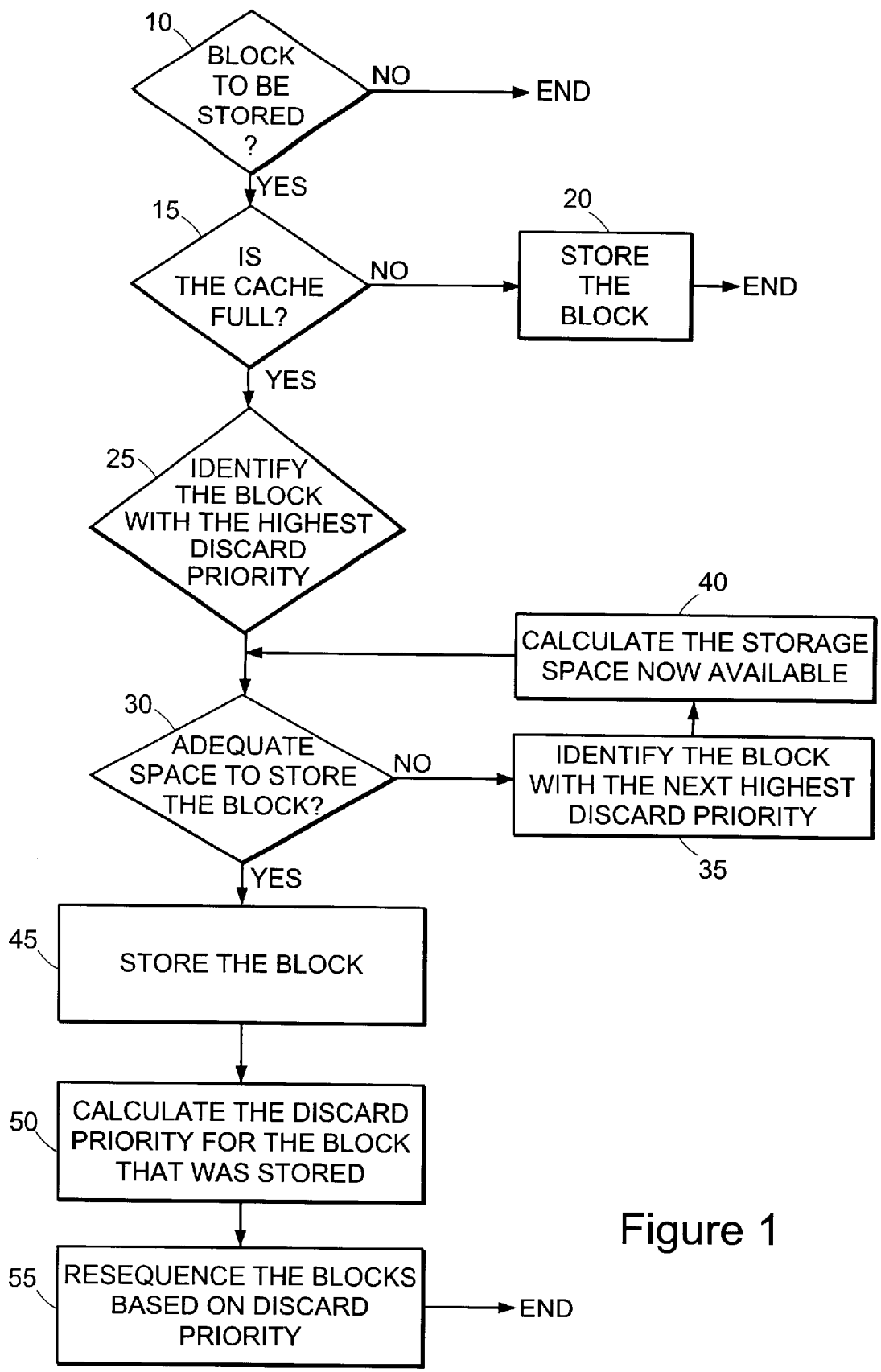
FIG. 1 is a block diagram illustrating the sequence of steps used to cache a block of information, in accordance with the method of this invention.

The present invention provides for the efficient caching of blocks of information on the hard drive of a local client computer. One aspect of the invention features a Least Recently Least Frequently Used (LRLFU) method for efficient caching. FIG. 1 is a block diagram illustrating the sequence of steps used to cache a block of information, in accordance with the method of this invention.

A storage space is allocated to provide a cache in memory (e.g., the hard drive) for cached blocks of information to be stored on the client computer. In one embodiment, the storage space is allocated prior to the caching of the first block of information. In another embodiment, the storage space is allocated simultaneously with the caching of the first block of information.

When a block of information is to be stored (step 10), the cache (or storage space) is checked to determine whether sufficient memory space exists for the block (step 15). If there is not sufficient space, the block is stored for use (step 20) and the method is finished for that block. If there is not sufficient room in the cache to store the block, the block with the highest discard priority is identified (step 25). A determination is made as to whether removal of the block with the highest discard priority will provide sufficient space to store the incoming block (step 30). If insufficient space is available, the block of information with the next-highest discard priority is identified (step 35), and the amount of storage space to be provided by removal of these blocks is calculated (step 40). The cycle of steps 30, 35, and 40 is repeated until sufficient storage space is identified for the incoming block. The block is then stored (step 45) replacing the blocks identified above, and its discard priority calculated (step 50). The listing of the blocks is then sorted in order of descending discard priority (step 55). This process is repeated for each subsequent block of information to be cached.

A more particularize description of these method step is found in the can be used to calculate the discard priority.

In addition, blocks of information can be cached for various contents that employ multiple sequential work sessions. Blocks of information are retained in a cache on the hard drive of the local client computer, based on the likelihood of their being used in the future. This reduces the number of retrieval operations required to obtain these blocks of information from other data sources. Reducing the retrieval requirements from these slower sources results in improved efficiency, faster responses, and an enhanced user experience for the operator of the client computer.

Another feature of the LRLFU method is that blocks of information cached for a given content are not discarded at the end of the work session. Rather than abandoning the blocks of information cached for a content at the conclusion of a work session, the cache contents are retained. They are then available for a subsequent work session using the same content, provided the prior work session has finished. This persistent caching, of blocks of information reduces the amount of information a subsequent work session will need to obtain from the data source. The eventual elimination of the persistently cached blocks does not occur until their discard priority becomes sufficiently high to warrant replacing them with different blocks of information.

The discard priority of each block is used to determine which of them are least likely to be required in the future. When additional space for a new block of information is needed in the cache, the LRLFU method discards the block with the highest discard priority to make room for the new block. The block discarded can be from the cache of the present work session, the cache of an inactive work session of a different content or from the cache of a concurrently active work session of a different content.

Determination of the discard priority for each block of information contained in a cache represents an important aspect of this invention. Its determination is predicated on some general assumptions. When calculating, the discard priority for a block of information, it is likely that if that block was required in a prior work session, it will also be needed in a subsequent work session of the same content. Accordingly, continued caching of this block of information on the hard drive of the client computer reduces the likelihood of having to obtain it from a different and slower source in the future. Likewise, a block of information should be assigned a lower discard priority if it is accessed multiple times during a work session. Frequent access to the block during the current work sessions or prior work sessions is an indication it will be frequently accessed in the next work session of that content. Finally, if the prior work session was chronologically close in time to the present session, the common range of information used by the two sessions is likely to be larger. Calculation of the block discard priority reflects these assumptions.

For calculation of the discard priority of a block, the cache for the work session of content comprises several attributes. First, storage space is allocated to provide for the existence of the cache in memory (e.g., the hard drive of the client computer) as described above. Moreover, the cache has a specific size initially, although the size of the cache for different contents can vary. However, the cache size of each work session can be dynamically adjusted. After the cache has become full, a new block of information is written to the storage location of the cached block with the highest discard priority, effectively deleting the old block. The block deleted may have been stored for the present work session, the work session of content that is now inactive, or the active work session another content. The block to be deleted is selected based on its discard priority. This provides for the dynamic adjustment of the cache space available for each content being used, based on the discard priority calculation results.

Dynamic adjustment of the amount of storage space allocated to a cache may also be achieved by manual intervention. For example, if a user wishes to decrease the amount of storage space allocated for a cache, the LRLFU method removes sufficient blocks of information from the cache to achieve the size reduction. The blocks to be removed are determined based upon their discard priority, thereby preserving within the cache the blocks most likely to be used in the future.

In addition to the size of the cache, the Global Reference Number and the Head-of-the-List block identification location represent two more attributes of the cache for each work session. The Global Reference Number is reset to zero each time a work session is started, and is incremented by one each time the cache is accessed. The Head-of-the-List block identification location indicates the identity of the block in the cache of the work session that possesses the highest discard priority. In other embodiments of the invention, it can be used to indicate the identity of the block with the highest discard priority as selected from the current work session, any inactive work sessions, and/or any other active work sessions.

Likewise, each block contained within the cache of a work session has certain attributes that are used in calculating its discard priority. Each block has associated with it (for example, as an array) a Reference Number, plus up to m entries in its Reference Count array. The Reference Number of a block is set equal to the value of the (Global Reference Number each time that block is accessed. This value is stored as the Reference Number of that block. The block Reference Numbers can be used to sort them in the order in which they have been accessed.

The m entries of the Reference Count array for each block represent the number of times that block was accessed in each of the previous m work sessions. The present session is identified as session 0, the prior session is identified as session 1, and so forth. Up to m entries in the Reference Count array arc stored for a given block. The value stored in Reference Count array for each session represents how many times that block was accessed during that session. By using, the Reference Number and the Reference Count array values for a given block, its discard priority can be calculated as discussed below.

Initialization of the above-identified parameters is performed as follows. When the client computer is booted up, the Reference Number and Reference Count array values are set to zero. When a work session is started, the Global Reference Number for that cache is set to zero, and the Reference Count values for each block in the array are shifted one place to the right, discarding the oldest values at position m−1 (the position that is assigned to session m). The Reference Count values for session 0 (the present session) start at zero and are incremented by one each time the block is accessed.

These values are used by the LRLFU method to calculate the discard priority. The discard priority of a block is calculated each time it is accessed. After the Discard Priority has been calculated the list of blocks is sorted in descending order based on the discard priority calculated. The block with the highest discard priority is at the top of the sorted list, and its identity is indicated in the Head-of-the-List block identification location. It is the first block to be discarded when additional space is required in the The discard priority of a block is determined based on a calculated weighted time factor (Tw) and weighted frequency factor (Fw). They are used as follows:

Block Discard Priority=$N1*1/((1+Tw) \times Fw)$

And calculated by the following formulae:

$Tw=P1*$(Block Reference number/Global Reference Number)

$Fw=P2*\Sigma_m(RefCount[m]/2^m)$

In these equations, N1 represents a normalization factor and is set to a fixed value that causes the result of the equation to fall within a desired numerical range. P1 and P2 are weighting factors. They are used to proportion the relative weight given to the frequency factor (Fw) is compared with the time factor (Tw), to achieve the desired results.

The time factor (Tw) is proportional to the time of last access of the block within the work session. If the block has not been accessed during the current work session, the time factor is zero. If the block was recently accessed, the time factor has a value approaching P1 times unity.

The frequency factor (Fw) represents the number of times the block has been accessed during the current session (session number 0) through the mth session (session number n−1). These are summed up and discounted based on the age of the prior work session(s). In the above equation, the discounting is performed by the factor $2^m$, where m represents the session number corresponding to the Reference Count array value for that block of information. Other discounting factors can be used for this purpose. Greater discounting of older work session Reference Count array data can be accomplished by using factors such as $2^{2m}$, or $2^{mm}$, etc., in place of $2^m$. Alternatively, discounting of the older work session Reference Count array data could be reduced, for example, by using a discounting factor of $1.5^m$ or the like, in place of $2^m$, thereby more strongly emphasizing, the Reference Count array values of the older work sessions for each block.

Block Discard Priorities can be calculated using the results of the above calculations. These are calculated for a block of information each time it is accessed from the cache. After the discard priority has been calculated, the listing of the blocks is resequenced and the block with the highest discard priority is positioned at the top of the list. The identity of this block is placed in the Head-of-the-List block identification location. It then becomes the next block to be discarded when additional cache space is required. Should the space required for the incoming block of information be greater than what was freed up, then the block of information with the next highest discard priority is also discarded, and so on. By this method sufficient room is created for the incoming block of information.

Operating in this manner, the LRLFU method provides for efficient utilization of the storage space allocated for the caching of blocks of information for a given work session of a content. This is done by discarding the block with the highest discard priority, as calculated by the LRLFU method, to methodically create room for the new blocks to be cached for the ongoing work session. The blocks discarded are those least likely to be needed in the future, based on when they were last accessed and how often they have been used in prior work sessions. At completion of the work session the cache is not cleared, but the blocks of information and their corresponding priority information are retained for use with subsequent work sessions of that content. Since the cache is not cleared at the termination of the work session, the method also provides for the persistent storage of the blocks of information most likely to be needed by present or future work sessions of a given content. This results in improved performance, increased efficiency, and an enhanced user experience.

By utilizing the above method and adjusting the parameters identified and explained, improved utilization of the hard drive space available for caching can be performed.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for caching blocks of information for content utilized by a client computer in an active work session and one or more previous work sessions, the method comprising:
    a) caching blocks of information in allocated storage space on a hard drive of the client computer;
    b) storing, for each block of information, a first parameter corresponding to when the block of information was accessed by the active work session, and a second parameter corresponding to the number of times the block of information was accessed by the client computer in the one or more previous work sessions;
    c) determining a discard priority value for each block of information using the first parameter and the second parameter; and
    d) discarding stored blocks of information from the storage space based upon their discard priority value to create additional room for new blocks of information in the storage space.

2. The method of claim 1 wherein step a) further comprises dynamically allocating storage space or the hard drive of the client computer.

3. The method of claim 1 wherein step a) further comprises dynamically allocating storage space on the hard drive of the client computer by reassigning storage space from a cache of an inactive work session to a cache of the active work session.

4. The method of claim 1 wherein step a) further comprises dynamically allocating storage space on the hard drive of the client computer by reassigning storage space from a cache of the active work session to a cache of another active work session.

5. The method of claim 1 further comprising e) changing the size of the allocated storage space for a cache of any of the work sessions.

6. The method of claim 1 further comprising e) reducing the size of the allocated storage space for a cache of any of the work sessions by discarding blocks of information based upon their discard priority values.

7. The method of claim 1 further comprising:
    e) retaining cached blocks of information at the end of a work session for use in a subsequent work session.

8. The method of claim 1 wherein step b) further comprises determining the second parameter for each block of information based on at least one of the number of times the block has been accessed during the active work session, the number of times the block was accessed in a prior work session, or the number of times the block was accessed in a plurality of prior work sessions.

9. The method of claim 1 wherein step b) further comprises determining the second parameter for each block of information based on at least one of the number of times the block has been accessed during the active work session, the number of times the block was accessed in a prior work session, or the number of times the block was accessed in a plurality of prior work sessions, and step c) further comprises determining the discard priority value for each block of information based on at least one of the second parameter or a number of access cycles of the cache since which the block of information has been used.

10. A method for caching blocks of information on the hard drive of a client computer, the method comprising:
    a) allocating storage space on a hard drive of the client computer for each active work session;
    b) caching the blocks of information for each active work session in the allocated storage space;
    c) storing, for each block of information, a first parameter corresponding to the number of times the block of information has been accessed by the client computer;
    d) determining a discard priority value for each block of information using the first parameter;
    e) discarding stored blocks of information from the storage space of each work session based upon their discard priority value, to provide additional storage space for new blocks of information for each such active work session on the hard drive of the client computer.

11. The method of claim 10 wherein step e) further comprises discarding stored blocks of information from the storage space of an inactive work session.

12. The method of claim 10 wherein step e) further comprises discarding stored blocks of information from the storage space of another active work session.

13. The method of claim 10 further comprising:
    f) retaining cached blocks of information at the end of a work session for use in a subsequent work session.

14. The method of claim 10 further comprising f) changing the size of the allocated storage space for one of the active work sessions.

15. The method of claim 10 further comprising f) reducing the size of the allocated storage space for one of the active work sessions by discarding blocks of information based upon their discard priority values.

16. The method of claim 10 wherein step c) further comprises determining the first parameter for each block of information based on at least one of the number of times the block has been accessed during the current work session, the number of times the block was accessed in a prior work session, or the number of times the block was accessed in a plurality of prior work sessions.

17. The method of claim 10 wherein step c) further comprises determining the first parameter for each block of information based on at least one of the number of times the block has been accessed during the current work session, the number of times the block was accessed in a prior work session, or the number of times the block was accessed in a plurality of prior work sessions, and step d) further comprises determining the discard priority value for each block of information based on at least one of the first parameter or a number of access cycles of the cache since which the block of information has been used.

18. A method for caching blocks of information for content utilized by a client computer in an active work session and one or more previous work sessions, the method comprising:

a) caching blocks of information in allocated storage space on the client computer;

b) storing, for each block of information, a first parameter corresponding to when the block of information was accessed by the active work session, and a second parameter corresponding to the number of times the block of information was accessed by the client computer in the one or more previous work sessions;

c) determining a discard priority value for each block of information using the second parameter; and d) discarding stored blocks of information from the storage space based upon their discard priority value to create additional room for new blocks of information in the storage space.

19. The method of claim 18 wherein step a) further comprises dynamically allocating the storage space, and step b) further comprises determining the second parameter for each block of information based on at least one of the number of times the block has been accessed during the active work session, the number of times the block was accessed in a prior work session, or the number of times the block was accessed in a plurality of prior work sessions.

20. The method of claim 18 wherein step a) further comprises dynamically allocating the storage space, step b) further comprises determining the second parameter for each block of information based on at least one of the number of times the block has been accessed during the active work session, the number of times the block was accessed in a prior work session, or the number of times the block was accessed in a plurality of prior work sessions, and step c) further comprises determining the discard priority value for each block of information based on at least one of the first parameter or a number of access cycles of the cache since which the block of information has been used.

* * * * *